3,176,029
PREPARATION OF VITAMIN D$_3$
Kekhusroo R. Bharucha, Toronto, Ontario, and Frank M. Martin, Rexdale, Ontario, Canada, assignors to Canada Packers Limited, Toronto, Canada
No Drawing. Filed Sept. 11, 1962, Ser. No. 222,945
21 Claims. (Cl. 260—397.2)

This invention relates to the production of vitamin D$_3$ and more particularly to a novel procedure for treating the irradiation products of 7-dehydrocholesterol in order to obtain an enriched vitamin D$_3$ material.

Vitamin D$_3$ is conventionally prepared by the irradiation of 7-dehydrocholesterol. The irradiated material after removal of the solvent employed in the irradiation process, is then dissolved in ethanol, which is cooled to a relatively low temperature and filtered. Vitamin D$_3$ will remain in the cooled alcoholic solvent, whereas the bulk of the unconverted 7-dehydrocholesterol (hereinafter designated as "provitamin"), will crystallize at the low temperature and will be separated from the solution by the filtration procedure. Following evaporation of the filtrate, a crude gum containing about 30% or more of vitamin D$_3$ along with further quantities of provitamin and impurities is recovered.

For many purposes, including the preparation of poultry feeds and the like, the crude ethanol gum can be utilized for its vitamin D$_3$ content without further purification. In other instances a more highly concentrated source of vitamin D$_3$ is desirable. For certain purposes such as pharmaceutical uses, fortification of milk, etc., the pure crystalline vitamin is desirable. It has been proposed to esterify the crude vitamin D$_3$ containing gum in benzene-pyridine with 3,5-dinitrobenzoyl chloride and to separate the vitamin D$_3$ ester by fractional crystallizations. The dinitrobenzoate of vitamin D$_3$ is then saponified to provide free vitamin D$_3$, which can then be purified by crystallization for solvents. However, 3,5-dinitrobenzoyl chloride is an expensive reagent, and the yields from the known procedure are relatively small. The preparation of crystalline vitamin D$_3$ is very expensive and no good process has heretofore been found for making it economically available.

It is an object of the present invention to provide a process for producing an enriched vitamin D$_3$ product from a crude irradiation gum.

Another object of the invention is to provide a more suitable vitamin D$_3$ source material for use in the esterification process for producing crystalline vitamin D$_3$.

Another object of the invention is to provide a process for producing an enriched vitamin D$_3$ product from a crude irradiation gum with separate recovery, in substantially pure form, of unreacted 7-dehydrocholesterol.

Other objects and advantages of the invention will be apparent from the disclosures below:

The essence of the invention involves the separation of an adduct of vitamin D$_3$ and provitamin (7-dehydrocholesterol) from the crude gum resulting from ethanol treatment of the irradiation products of 7-dehydrocholesterol. The adduct incorporates a substantial quantity of the 7-dehydrocholesterol which remains after ethanol treatment of the irradiated product. The fraction remaining after separation of the adduct is therefore enriched in vitamin D$_3$ content. The adduct may be treated o recover 7-dehydrocholesterol in substantially pure form, suitable for reuse in the irradiation process or for other purposes requiring a relatively pure compound, while at the same time providing an enriched vitamin D$_3$ containing material for use directly for its vitamin content or for working up by the known esterification procedures to eventually obtain crystalline vitamin D$_3$. The enriched fraction of the crude gum from which the vitamin D$_3$-provitamin adduct has been removed may be used directly or further enriched by solvent partitioning, in a manner hereinafter described, to provide a second source of enriched vitamin content also eminently suitable for working up by the esterification process for the production of crystalline vitamin D$_3$. By reason of the enrichment of the starting material for the esterification process, savings are effected in the quantity of reagent utilized for the esterification process and a more readily purified ester is obtainable for production of improved yields of crystalline vitamin D$_3$.

The vitamin D$_3$-provitamin adduct is apparently inherently present in the mixture resulting from the irradiation of 7-dehydrocholesterol but has not been previously recognized. We have found that during the separation of provitamin from vitamin D$_3$ by the ethanol treatment, it is sometimes possible to obtain a second crop of crystals which, from their ultraviolet light absorption properties, we have identified as the adduct of vitamin D$_3$ and provitamin. We have further discovered that this adduct can be obtained consistently and in improved yields by crystallizing the ethanol-treated gum from methanol. The separation of the adduct and the utilization of this material as a starting material for the production of crystalline vitamin D$_3$ is a new concept and is important because it provides a vitamin D$_3$-containing material less contaminated with vitamin isomers and other reaction products, thereby facilitating the isolation of the pure vitamin ester and, moreover, provides a means for obtaining provitamin content for reuse which would otherwise be lost. The economies of the irradiation process are thereby considerably improved. Since the gum from which the adduct has been removed is also usable, either with or without further enrichment, all of the vitamin D$_3$ is recovered and all of it can be utilized.

While the adduct may be obtained in any desired manner, as by using the second crop of crystals from ethanol treatment of the irradiation product, the preferred means of obtaining the adduct is by the methanol crystallization of the ethanol-treated gum. After separation of the adduct, a methanolic mother liquor is obtained which upon evaporation of the methanol provides a gum, hereinafter referred to as a "methanol gum," which is enriched as to vitamin D$_3$ content and which can be utilized as desired, but preferably is further enriched by solvent partitioning etc., as aforestated, and used in the production of crystalline vitamin D$_3$.

The crude vitamin D$_3$ provitamin adduct resulting from the methanol crystallization is cleaved, at least in part, to remove provitamin. This is best accomplished by treatment with a polar solvent such as acetone or methanol. Where methanol is used, it must be present in relatively large volume. Relatively pure provitamin (e.g., over 95% pure) can be removed from the adduct by crystallization from the polar solvent. A partial cleaving of the adduct is apparently accomplished by this treatment, the provitamin crystallizing out from the polar solvent since it is only loosely held in the adduct. After evaporation of the filtrate, an enriched adduct is obtained which can then be esterified to provide a mixture of the esters of the vitamin and remaining provitamin. The provitamin-vitamin ester mixture may be separated by fractional crystallizations and the provitamin ester hydrolyzed and re-used while the vitamin ester may be worked up to provide crystalline vitamin D$_3$.

The methanol-treated gum, from which the adduct has been removed, preferably after further enrichment by solvent partitioning, can be worked up separately in the esterification process or can be combined with the treated adduct prior to the esterification operation so that all of the enriched material may be esterified at once. In this way a good recovery of vitamin D$_3$ may be effected, much higher than starting with the crude vitamin gum and following the conventional procedure.

The steps of the overall enrichment process will be better understood from a consideration of the following flow diagram:

ENRICHMENT OF VITAMIN D₃

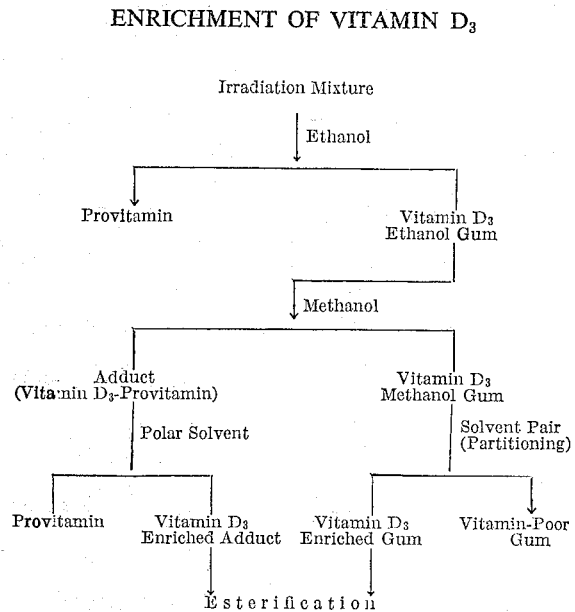

The esterification of the enriched vitamin D₃ material can be carried out with 3,5-dinitrobenzoyl chloride in known manner. Saponification of the 3,5-dinitrobenzoate can be carried out according to the method of Huber et al. [J. Am. Chem. Soc., 67, 609, (1945)] by refluxing with methanolic KOH solution whereby the ester gradually dissolves with concomitant separation of the potassium salt of 3,5-dinitrobenzoic acid. The saponification can also be brought about by stirring a suspension of the ester in methanolic KOH at room temperature for about one hour, or by using benzene and aqueous methanolic NaOMe solution at room temperature. With the aqueous methanolic NaOMe solution complete hydrolysis is best obtained by using at least about 4 moles of NaOMe per mole of ester. Percolation of a benzene solution of 3,5-dinitrobenzoate through alumina made strongly alkaline by treatment with concentrated alkali solution also results in satisfactory saponification. The free vitamin D₃ product is then crystallized from a solvent such as acetone.

While the enrichment process disclosed herein is quite useful in producing crystalline vitamin D₃ by the 3,5-dinitrobenzoate esterification route, even greater economies in the overall process are effected by use of a novel esterification procedure and new intermediate as set forth in copending application, S.N. 222,972 filed concurrently herewith.

The solvent partitioning of the methanol gum can be accomplished through the use of any of a number of immiscible solvent pairs including, for example, hexane-methanol and hexane-acetonitrile. Best results have been obtained by using the system: hexane-aqueous methanol. The hexane may be either a straight chain hydrocarbon, one with a cyclic structure, or a mixture of isomers. The aqueous methanol is preferably above 80% methanol content. An enriched vitamin D₃ product is recovered from the hexane phase. The partitioning does not cause any destruction of the vitamin and the balance of the material can be recovered from the methanol phase. Using vitamin gum thus enriched, the yield of pure vitamin dinitrobenzoate is considerably increased. From an economic standpoint, such enrichment of the crude vitamin gum prior to esterification offers decided advantages.

The invention is further illustrated by the following examples of practice:

EXAMPLE 1

Preparation of Adduct

Vitamin D₃ ethanol gum (309 g.) prepared in the conventional manner by ethanol treatment of irradiated 7-dehydrocholesterol was dissolved in distilled methanol (635 ml.) by warming almost to boiling. This was left at −18° C. overnight and produced a crystalline precipitate of vitamin-provitamin adduct. This was filtered off in a cold room, washed with cold (−18° C.) methanol, and dried in vacuo (25° C.) to a constant weight of 107.5 g. (34.8% by weight) of crude adduct. The crude adduct had a vitamin D₃ content of 31%. Evaporation of the methanol mother liquor provided a gum having a vitamin D₃ content of 42%, suitable for feed use or for further enrichment and/or preparation of crystalline vitamin D₃.

EXAMPLE 2

The 107.5 g. of crude adduct from Example 1 was dissolved in purified acetone (322 ml.) by warming and was then left to sit in the dark at room temperature for 25 hours. Needle-like crystals formed. These were filtered off, washed with cold acetone and dried in vacuo (25° C.). 26.13 g. of crystalline material which was found to be 100% pure provitamin (24.3% from the adduct) was obtained. This material was set aside for reuse in the irradiation process, or for other use as desired. The acetone mother liquor was evaporated in vacuo (25° C.) to provide an amber resin. The resin was dissolved in hexane and again taken down in vacuo to give 81.37 g. of enriched vitamin D₃-provitamin adduct containing about 40% of vitamin D₃.

EXAMPLE 3

Partitioning of vitamin D₃ methanol gum

Vitamin D₃ ethanol gum (109.2 g.) prepared in the conventional manner was dissolved in methanol (240 ml.) and the resulting solution was cooled to minus 10° C. for 5 hours. The solids, consisting essentially of vitamin D₃-provitamin adduct, were filtered off and the filtrate was evaporated in vacuo at 25° C. The resulting gum weighed 86.2 g., i.e., 79% by weight with respect to the ethanol gum treated. It was found to have a vitamin D₃ content of about 35%. A 1 g. portion of this gum was dissolved in 40 mls. of hexane. The hexane solution was extracted three times with 20 mls. of 91% (v./v.) aqueous methanol. The hexane layer was evaporated to dryness in vacuo at room temperature and gave 0.34 g. of residual gum. The vitamin D₃ content of this partitioned gum was determined to be about 48%.

Further 1 g. portions were partitioned under different conditions as shown in the following table:

TABLE I

Partitioning of Vitamin D₃ (Methanol-Treated) Gum

| Hexane (mls.) | Extracting Solvent (mls.) | No. of Extractions | Recovery wt. (percent) | Estimated Purity (265 mμ), percent | Overall Recovery from Hexane Phase (percent) |
|---|---|---|---|---|---|
| 10 | 95% MeOH (10) | 3 | 14 | 47.7 | 18.8 |
| 10 | 91% MeOH (5) | 3 | 40 | 38.8 | 43.8 |
| 20 | 91% MeOH (5) | 3 | 45 | 38.5 | 49 |
| 20 | 91% MeOH (10) | 3 | 32 | 43.3 | 38.7 |
| 20 | 91% MeOH (10) | 6 | 23 | 48.7 | 31.7 |
| 20 | 91% MeOH (20) | 3 | 22 | 49 | 30.4 |
| 40 | 91% MeOH (20) | 1 | 59 | 35.4 | 59 |
| 40 | 91% MeOH (20) | 2 | 41 | 43 | 49.8 |
| 20 | Acetonitrile (20) | 3 | 11 | 44.7 | 14 |

EXAMPLE 4

An ethanol treated gum (58 g.) from the irradiation of 7-dehydrocholesterol was dissolved by warming it in methanol (125 mls.). The solution was kept at minus 18° C. for six and one-half hours. The solids were filtered off, washed with cold (−18° C.) methanol and dried in vacuo (25° C.). A yield of 18.82 g. of almost colorless solid consisting essentially of vitamin-provitamin adduct was obtained. The filtrate was evaporated in vacuo (25° C.) to a yellowish frothy resin which weighed 37.4 g. The vitamin $D_3$ content of this gum was about 43%. The methanol treated gum (37.4 g.) was dissolved in hexane (1500 mls.) and extracted with three 750 ml. portions of aqueous methanol (91%). The hexane layer was then evaporated to a yellowish frothy resin which weighed 18.6 g. The vitamin $D_3$ content of this resin was determined to be about 58.5%. The overall recovery of the vitamin $D_3$ from the hexane phase was 67.3%.

The enriched vitamin resin (18.6 g., 58.5% purity) was dissolved in benzene-pyridine and esterified with 3,5-dinitrobenzoyl chloride. A yield of 26.95 g. (95.6%) of crude vitamin $D_3$ dinitrobenzoate was obtained. After purification, the vitamin ester was saponified according to the method of Huber et al., J. Am. Chem. Soc. 67, 609 (1945), and vitamin $D_3$ crystallized from aqueous acetone.

EXAMPLE 5

5 g. of crude ivtamin $D_3$-provitamin adduct obtained by the methanol treatment of an ethanol gum (as in Example 1) was dissolved in 75 mls. of distilled methanol by heating on a steam bath. The solution was allowed to cool to room temperature overnight in the dark. The crystals were then filtered off, washed with cold methanol and dried at 30° C. under 10 mm. Hg. A yield of 1.53 g. (30% by weight) was obtained. The product was determined to be provitamin of approximately 97% purity. Evaporation of the methanolic solution provides an enriched vitamin $D_3$ material.

EXAMPLE 6

An ethanol solution of 7-dehydrocholesterol irradiation mixture, from which provitamin had been removed, was evaporated in vacuo to remove most of the ethanol. The residual mixture (77 g.) was dissolved in warm methanol (250 mls.) and the solids were separated out by cooling at −18° C. for 17 hours. In this manner, 21.63 g. of provitamin-vitamin $D_3$ adduct were recovered. The methanol filtrate was evaporated in vacuo (25° C.) to provide 33.0 g. of a yellowish gum which contained approximately 37% vitamin $D_3$ content. This gum was dissolved in 1320 mls. of hexane and the hexane solution was extracted 3 times with 660 mls. of 91% methanol (1800 mls. methanol plus 180 mls. water). The hexane phase was evaporated in vacuo and gave 17.1 g. (52% weight yield) of vitamin enriched gum having a vitamin $D_3$ content of approximately 55%. The recovery of vitamin $D_3$ in the hexane phase was 76.5%. The methanol extracts were evaporated to a small volume in vacuo and extracted with benzene. Evaporation of the benzene solution gave 16.5 g. of a yellowish gum containing a relatively small but usable amount of vitamin $D_3$.

The enriched vitamin fraction (17.1 g.) was dissolved in benzene-pyridine and was esterified with 3,5-dinitrobenzoyl chloride. 23.8 g. (92%) of crude vitamin $D_3$ 3,5-dinitrobenzoate was recovered. The crude ester was purified by crystallization from acetone-methanol to provide substantially pure vitamin $D_3$ 3,5-dinitrobenzoate. The yield of acceptable material ($[\alpha]_D+97°\pm3$) was 37.3% based on the estimated vitamin content of the enriched gum. The vitamin ester was then hydrolyzed in benzene at 10° C. with a solution containing sodium methoxide in distilled methanol and water. Free vitamin $D_3$ of 95% purity was obtained.

EXAMPLE 7

20 g. of crude adduct from the methanol treatment of an ethanol gum, containing a vitamin $D_3$ content of approximately 40%, was dissolved in distilled acetone by warming. The clear solution was left at room temperature overnight. The cluster of needles was filtered off, washed with cold acetone and dried in vacuo at 30° C. A recovery of 5.11 g. (25.6% by weight) of 96% pure provitamin $D_3$ was obtained. Evaporation of mother liquor provided 14.35 g. of a powdery solid enriched with respect to vitamin $D_3$. This enriched vitamin fraction was esterified in benzene-pyridine with 3,5-dinitrobenzoyl chloride. Most of the remaining provitamin (as the ester) precipitated from the esterification mixture due to its low solubility in the reaction medium. Additional provitamin ester was recovered by trituration of the crude esterification gum with acetone and filtration. The combined provitamin ester fractions were hydrolyzed by sodium methoxide in methanol and water with the recovery of 2.62 g. of 93% pure provitamin. The acetone filtrate from which provitamin ester had been removed yielded 9.74 g. of vitamin $D_3$ 3,5-dinitrobenzoate in substantially pure form. A portion of the vitamin $D_3$ ester was hydrolyzed in benzene with aqueous methanolic NaOMe solution (4 molar proportions) to provide free vitamin $D_3$ of 97.8% purity. A summary of the recovery from the 20 g. of crude vitamin adduct used as the starting material is as follows:

Vitamin $D_3$ (as the ester)__ 9.7 g. (6.5 g. vitamin) or approximately 80% of the vitamin $D_3$ contained in the starting adduct.

Provitamin $D_3$ (reusable)__ 5.11 g. (25.6% by weight) direct from adduct.
2.62 g. (13.3% by weight) from hydrolyzed provitamin ester.

Residues _____ After hydrolysis the combined ester residues gave 2.56 g. of a product which apparently contained 60% vitamin.

EXAMPLE 8

283.0 g. of crude adduct obtained from the methanol treatment of ethanol gum (as in Example 1) was dissolved in acetone (850 mls.) by slightly warming and the solution was allowed to cool to room temperature overnight in the dark. Colorless needles crystallized from the solution and were filtered off, washed with cold acetone and dried in vacuo. A yield of 62.82 g. (22% by weight) was obtained. This product was provitamin of approximately 95% purity. An enriched vitamin $D_3$-provitamin adduct was obtained by removing the solvent from the mother liquor. To an ice-cold solution of a portion of the enriched vitamin-provitamin adduct (202 g.) in dry distilled benzene (710 mls.) and distilled pyridine (150 mls.), a filtered solution of 3,5-dinitrobenzoyl chloride (144 g.) in benzene (440 mls.) was added. The mixture was then set aside at room temperature in the dark for 1 hour and 20 minutes, cooled to 8° C. for 40 minutes and filtered. The filtercake was washed separately with water three times, with dilute $NaHCO_3$ solution, and finally with water to neutrality. On drying, crude provitamin ester (56.84 g.), melting point 189–191° C., was thus obtained. The benzene filtrate from above was washed with water, dilute HCl solution, water, saturated $NaHCO_3$ solution, and finally three times with water to neutrality. Evaporation of the dried benzene solution in vacuo at 25°/10 mm. gave a gum which, upon purification with hexane, provided 194.3 g. of crude vitamin $D_3$ 3,5-dinitrobenzoate.

The crude vitamin ester was stirred with 1 liter of warm acetone (50° C.) and the mixture was allowed to cool slowly to 35° C. Finely divided crystals of provitamin ester were precipitated. The provitamin ester thus recovered weighed 18.63 g. The acetone mother liquor was treated with methanol to crystallize the vitamin $D_3$ ester. Vitamin $D_3$ 3,5-dinitrobenzoate (121.5 g.) having a melting point of 137–138°, $[\alpha]_D^{22} = +97.56$ (c.=1.0; $CHCl_3$) was obtained.

EXAMPLE 9

*Hydrolysis of vitamin $D_3$ 3,5-dinitrobenzoate with sodium methoxide*

The ester (0.5 g.; $[\alpha]_D^{26} = +97.45°$) in distilled benzene (5.0 mls.) was diluted with an aqueous methanolic NaOMe solution [NaOMe (0.183 g.; 4.0 molar proportion) in distilled methanol (3.0 ml.) and water (0.2 ml.)] which had previously been warmed to insure complete dissolution of the sodium methoxide. An additional 2 ml. of methanol was used to wash in the alkali solution. The clear reaction mixture was left to sit in the dark, under $N_2$, for a one-hour period, then transferred to a separatory funnel with water and benzene. The aqueous phase was separated off and re-extracted with benzene. The combined benzene extracts were washed three times with water until neutral and the benzene removed in vacuo (25°). An almost colorless froth weighing 0.35 g. and containing 97.8% of vitamin $D_3$ was obtained. (Theoretical yield of vitamin $D_3 = 0.34$ g.) Infrared spectrum in $CS_2$ showed the complete absence of a carbonyl band; i.e. the hydrolysis was complete.

EXAMPLE 10

*Hydrolysis of vitamin $D_3$ 3,5-dinitrobenzoate by stirring with methanolic KOH*

The ester (0.5 g.; $[\alpha]_D^{26} = +97.45°$) was magnetically stirred with methanolic KOH solution (0.19 g. KOH in 5 ml. distilled methanol) for one hour under $N_2$. During the reaction period the temperature of the mixture rose to ca. 35°. The mixture was then transferred to a separatory funnel with water and hexane. The aqueous layer was separated off and re-extracted with distilled hexane. The combined hexane extracts were washed three times with water until neutral, dried over $Na_2SO_4$ and evaporated to a very pale yellow froth in vacuo (25°). Yield=0.27 g. containing 97% vitamin $D_3$. Infrared spectrum showed the absence of ester.

EXAMPLE 11

*Hydrolysis of vitamin $D_3$ 3,5-dinitrobenzoate with boiling methanolic KOH cf. Huber et al. J.A.C.S. 67, 609 (1945)*

The ester (0.5 g.; $[\alpha]_D^{25} = +95.64°$) was heated under reflux in an $N_2$ atmosphere, with a methanolic KOH solution (0.19 g. KOH in 1.9 ml. MeOH) for 10 minutes with swirling, cooled quickly, and transferred to a separatory funnel with water and distilled hexane. The aqueous layer was separated off and re-extracted with hexane. The combined hexane extracts were washed with distilled water until neutral, dried over $Na_2SO_4$, and evaporated to a colourless solid froth in vacuo (25°). Yield=0.33 g. containing 90% vitamin $D_3$. Infrared spectrum showed the absence of ester.

EXAMPLE 12

The ester (2.0 g.; $[\alpha]_D^{26} = +97.45°$) was treated with a methanolic KOH solution (0.76 g. KOH in 7.6 mls. dist. MeOH) under reflux, in the manner set forth in Example 11. A yield of 1.34 g. of almost colourless froth containing 95% vitamin $D_3$ was obtained. Infrared spectrum in $CS_2$ indicated the complete absence of ester.

EXAMPLE 13

*Hydrolysis of vitamin $D_3$ 3,5 - dinitrobenzoate with alkaline alumina prepared by the method of Castells and Fletcher J.C.S. 3245–3246 (1956)*

Alumina (100 g.) was shaken for 2 hours with a solution of KOH (10.0 g.) in water (7.5 mls.) and used as such. The ester (0.5 g.; $[\alpha]_D^{28} = +95.94°$) in benzene (5 mls.) was adsorbed on a column of the alumina (30 g.) and eluted with benzene. The hydrolysis was complete as evidenced by the fact that the purple colour only travelled down half the column and stopped. Elution with 250 mls. of benzene followed by evaporation of the eluate in vacuo (25° C.) provided 0.33 g. (Theor. yield 0.34 g.) of colourless froth containing 91% vitamin $D_3$.

In all of the examples, the operations were conducted under an inert atmosphere (nitrogen) wherever possible.

It will be seen that an important new process has been provided for enriching vitamin $D_3$ irradiation products and for recovering usable products therefrom.

We claim:

1. A process for the treatment of the irradiation products of 7-dehydrocholesterol, comprising: treating said irradiation products with ethanol to remove a portion of the unreacted provitamin and provide a residual ethanol gum, dissolving said ethanol gum in methanol, precipitating an adduct of vitamin $D_3$ and provitamin from the methanol solution, and separating said precipitated adduct from said solution.

2. The process of claim 1 wherein the vitamin-provitamin adduct is cleaved by treatment with an organic polar solvent to remove at least part of the provitamin content and thereby provide a vitamin $D_3$ enriched product.

3. The process of claim 2 wherein the organic polar solvent is acetone.

4. The process of claim 2 wherein the vitamin $D_3$ enriched product is esterified to provide a mixture of vitamin and provitamin esters.

5. The process of claim 4 wherein the mixed esters are separated and the vitamin $D_3$ ester is subjected to saponification to provide the free vitamin.

6. The process of claim 5 wherein said free vitamin is crystallized from a solvent to provide crystalline vitamin $D_3$.

7. The process of claim 1 wherein the methanol solution, after separation of the adduct, is evaporated to provide a residual methanol gum, and wherein said methanol gum is treated by partitioning between polar and nonpolar solvents to provide a vitamin enriched product.

8. The process of claim 7 wherein said partitioning is accomplished by the use of hexane and aqueous methanol, the vitamin enriched product being obtained from the hexane fraction.

9. The process of claim 7 wherein the vitamin enriched product is subjected to esterification to provide a vitamin ester.

10. The process of claim 9 wherein the vitamin ester is subjected to saponification to provide the free vitamin.

11. The process of claim 10 wherein the free vitamin is crystallized from a solvent to provide crystalline vitamin $D_3$.

12. A process for the treatment of the irradiation products of 7-dehydrocholesterol, comprising: treating said irradiation products with ethanol to remove a portion of the unreacted provitamin and provide a residual ethanol gum, dissolving said ethanol gum in methanol, cooling the methanol solution to precipitate an adduct of vitamin $D_3$ and provitamin, removing said adduct and evaporating the remaining solution to provide a product enriched in vitamin $D_3$ content.

13. The process of claim 12 wherein the adduct of vitamin $D_3$ and provitamin is dissolved in acetone, the acetone solution is cooled to precipitate provitamin, the provitamin is removed from the acetone solution and the remaining acetone solution is evaporated to provide a product enriched in vitamin $D_3$ content.

14. The process of claim 13 wherein the provitamin removed from the acetone solution is returned to the irradiation operation.

15. The process of claim 12 wherein the enriched vitamin $D_3$ product obtained from evaporation of the methanol solution is dissolved in hexane, the hexane solution is extracted with aqueous methanol solution, and the hexane fraction after said extraction is evaporated to provide a product further enriched in vitamin $D_3$ content.

16. The process of claim 13, including the steps of esterifying the enriched vitamin $D_3$ product, separating the vitamin $D_3$ ester from the reaction medium, hydrolyzing the ester and recovering vitamin $D_3$ in relatively pure form.

17. The process of claim 16 wherein the ester is hydrolyzed by treatment with aqueous methanolic sodium methoxide solution containing at least about four moles of sodium methoxide per mole of ester.

18. The process of claim 16 wherein the ester is hydrolyzed by treatment with methanolic KOH solution.

19. The process of claim 16 wherein the ester is hydrolyzed by treatment with strongly alkalinized alumina.

20. A process for the preparation of vitamin $D_3$, comprising: treating vitamin $D_3$ 3,5-dinitrobenzoate with an aqueous methanolic solution of sodium methoxide containing at least about four moles of sodium methoxide per mole of ester to hydrolyze said ester, and recovering the free vitamin $D_3$ from the hydrolyzed mixture.

21. A process for the preparation of vitamin $D_3$, comprising: treating vitamin $D_3$ 3,5 - dinitrobenzoate with alumina made strongly alkaline by treatment with concentrated alkali solution to hydrolyze said ester, and recovering free vitamin $D_3$ from the hydrolyzed mixture.

References Cited in the file of this patent
UNITED STATES PATENTS

| | | |
|---|---|---|
| 2,376,563 | Terry | May 22, 1945 |
| 2,707,710 | Kelluz et al. | May 3, 1955 |
| 2,862,934 | Koevoet et al. | Dec. 2, 1958 |